Oct. 17, 1967  W. FROEDE  3,347,213
ROTARY COMBUSTION ENGINE
Filed Oct. 22, 1965

INVENTOR
WALTER FROEDE
BY
ATTORNEY

United States Patent Office 3,347,213
Patented Oct. 17, 1967

3,347,213
ROTARY COMBUSTION ENGINE
Walter Froede, Neckarsulm, Germany, assignor to NSU Motorenwerke Aktiengesellschaft, Neckarsulm, Germany and Wankel G.m.b.H., Bodensee, Germany
Filed Oct. 22, 1965, Ser. No. 500,675
Claims priority, application Germany, Nov. 20, 1964, N 25,839
6 Claims. (Cl. 123—8)

ABSTRACT OF THE DISCLOSURE

Throttling and deflecting primary and secondary intake valve for a rotary engine.

---

Figure 1:
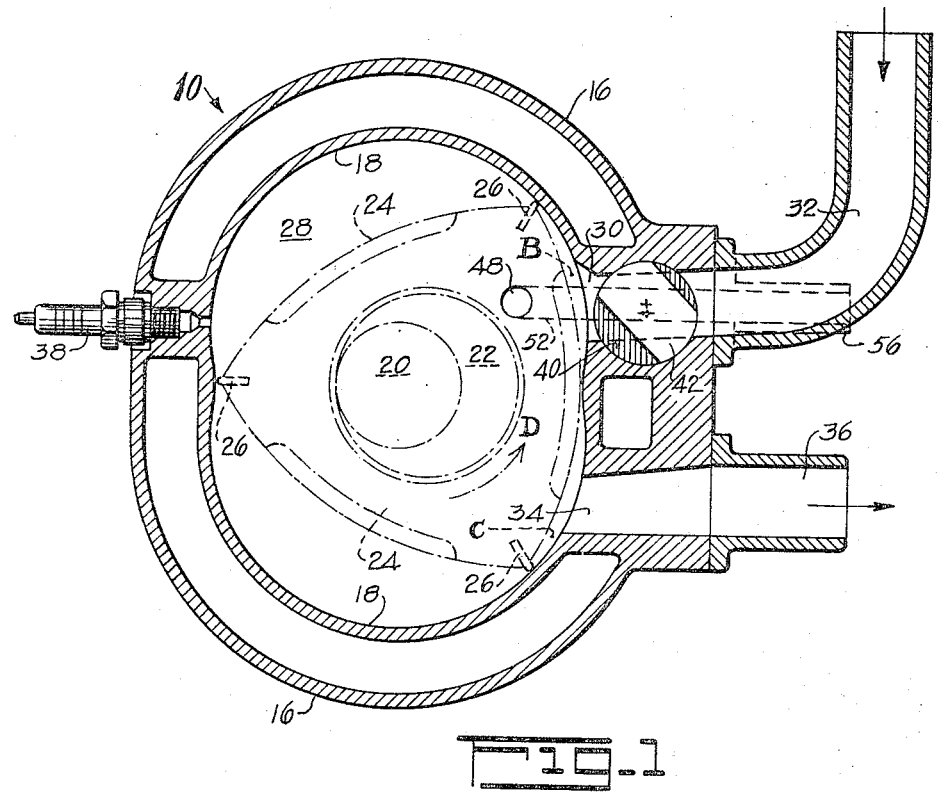

This invention relates to rotary combustion engines and is more particularly directed to a valve construction for the intake port of said rotary combustion engine. The rotary combustion engine as described herein is similar to the type disclosed in U.S. Patent No. 2,988,065.

Rotary combustion engines of the type described herein generally comprise an outer body including a pair of end walls interconnected with a peripheral wall to form a cavity whose profile is preferably basically an epitrochoid. An inner body or rotor is disposed within the outer body cavity and supported on a shaft with the axis of the rotor being in eccentric relationship to the axis of the cavity. The rotor is supported for rotation relative to the outer body and is provided with a plurality of apex portions which are disposed in sealing engagement with the inner surface of the outer body cavity to form a plurality of working chambers which, upon relative rotation of said rotor and the outer body, vary in volume. Intake and exhaust means are provided for supplying air or a fuel-air mixture to the working chambers and for expelling the discharged or brunt gases from the working chambers, respectively, and an ignition means may be provided for igniting the fuel-air mixture. During rotation of the rotor relative to the outer body, the four phases of intake, compression, combustion, and exhaust are carried out in each of the working chambers of the rotary combustion engine.

As explained in co-pending application 291,526, filed June 28, 1963, a throttle or shut-off flap valve may be provided to prevent exhaust gases from passing into the intake port during operation, particularly under partial load. During partial load operation, when a working chamber is disposed in a position so that passage of exhaust gases may flow from the exhaust port to the intake port, this overlap condition between the intake and exhaust ports permits exhaust gases to collect in the mouth portion of the intake port, which can result in poor combustion and rough operation during idling and partial load operation. Furthermore, since the pressure in the working chambers is relatively low during partial load operation, some of the fresh gases being supplied to the intake port may pass over into the exhaust port during the overlap condition which therefore results in the loss of part of the charge for combustion and thus poor operation economy.

The invention is generally carried out by providing a cylindrically-shaped rotary valve, which valve is disposed in the intake port in a position substantially close to the inner surface of the peripheral wall. The rotary valve member is provided with an opening or port through which the air or fuel-air mixture flowing through the intake means may flow into a working chamber of the engine. During partial load operation, the port in the rotary valve member is disposed, through a suitable adjustment mechanism, so that the flow through the port in the rotary valve member will be directed substantially tangential to the inner surface of the peripheral wall in the direction of rotor rotation. By this means, the incoming mixture will be directed away from the exhaust port and there will be less likelihood of the fresh charge flowing back through the exhaust port opening. Further, the disposition of the rotary valve member is such that flow of exhaust gases up into the intake port is substantially prevented.

Accordingly, it is one object of the invention to provide a novel and improved valve construction for the intake port in a rotary combustion engine.

It is another object of the invention to provide means for preventing loss in the flow of the fresh charge for the working chambers through the exhaust port during overlap conditions of the intake and exhaust ports under partial load operation of said engine.

It is a further object of the invention to provide means for substantially preventing flow of exhaust gases into the intake port during partial load operation.

It is still another object of the invention to provide means for preventing exhaust gases from passing into the intake port and for preventing reverse flow of the fresh charge toward the exhaust port when the rotor is in such a position such as to permit an overlap between the intake and exhaust ports in a rotary combustion engine.

Figure 2:
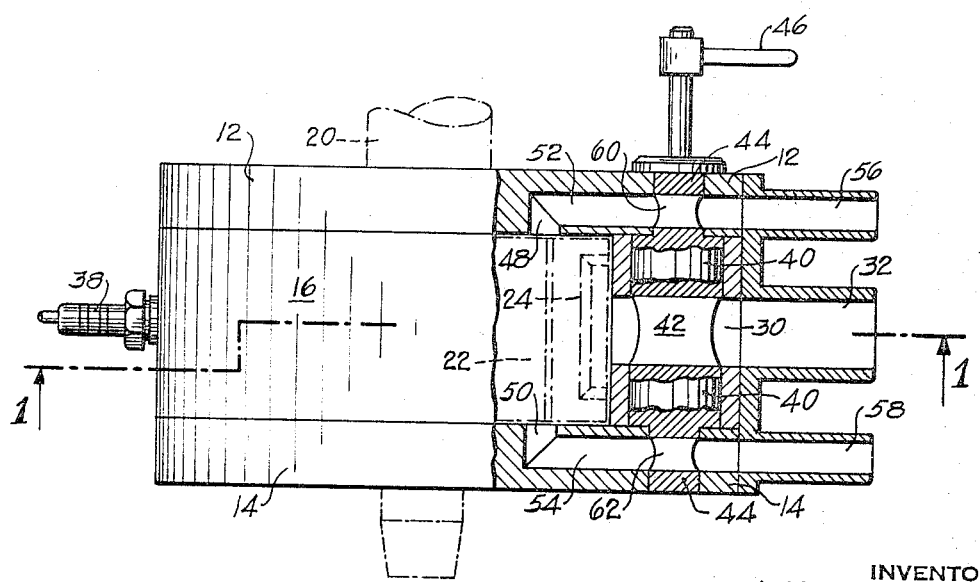

Other objects and advantages of the invention will be best understood by reading the following detailed description with the accompanying drawings wherein:

FIG. 1 is a sectional view of the engine of the invention taken along line 1—1 of FIG. 2; and FIG. 2 is a partial sectional view of the invention with the valve mechanism shown therein.

Referring to the drawings, a rotary combustion engine is shown as having an outer body comprised of a pair of axially spaced end walls 12 and 14 interconnected with a peripheral wall 16. The inner peripheral surface 18 of the peripheral wall 16 has a profile which may be defined as being preferably basically a multi-lobed epitrochoid. A shaft 20 extends co-axially with the cavity defined by the outer body and has an eccentric portion 22 formed thereon, which eccentric portion 22 is disposed in the outer body cavity. A multi-lobed rotor 24 is rotatably supported on the eccentric portion 22 of the shaft 20, which multi-lobed rotor 24 has a plurality of apex portions which are disposed in sealing contact with the inner surface 18 of the peripheral wall 16. Seal means 26 are disposed in grooves in each of the apex portions of the rotor 24, which seal means 26 maintain sealing engagement between the rotor and the inner surface 18 of the peripheral wall during relative rotation thereof. As seen in FIG. 1, a plurality of working chambers 28 are defined between the outer peripheral surface of the rotor and the inner surface 18 of the peripheral wall, there being one such working chamber defined between each adjacent pair of apex portions of the rotor 24. During relative rotation of the rotor in the outer body, the working chambers 28 vary in volume.

An intake port 30 is provided in one region of the peripheral wall for supplying air or a fuel-air mixture to the working chambers, which intake port 30 may be in communication with a carburetor through a suitable intake manifold structure such as shown in part at 32. An exhaust port 34 is provided in a region of the peripheral wall adjacent to the intake region, which exhaust port 34 is provided for expelling the burnt gases from the engine and may be suitably connected to an exhaust manifold structure partially shown at 36. Ignition means such as a spark plug 38 may also be provided for igniting the fuel-air mixture whereupon during operation of the engine the stages of intake, compression, combustion, and exhaust will be carried out.

As illustrated in FIG. 1, it will be seen that there are positions of the rotor wherein there will be an overlap between the intake port 30 and the exhaust port 34. When the rotor is in the position such as that illustrated in FIG. 1, the intake port 30 and exhaust port 34 will be in communication with one another through the working chamber 28 adjacent thereto. During partial load operation, the pressure in the working chamber 28, disposed adjacent the intake and exhaust ports will have a relatively low pressure therein. When this condition exists, the suction created in this working chamber will not only draw in a fresh charge from the intake port 30 but will also tend to draw exhaust gases from a region adjacent the exhaust port 34 labeled C in the drawing into the region labeled B of the working chamber so that the fresh charge will be mixed with the exhaust gases. The mixing of the fresh charge with the exhaust gases, particularly when idling or in low speed range, causes the fuel-air mixture to become contaminated and leads to rough engine operation. Of course, it should be kept in mind that this condition exists only when there is a relatively low chamber volume and that, in any event, only very small quantities of exhaust gas pass over into the portion of the chamber labeled B; but such amounts are sufficient to affect combustion. It will be apparent however that the volume present in the intake port and the intake manifold is substantially larger than that in the portion of the working chamber B and that the exhaust gases will have a tendency to flow into the greater volume area of the intake port 30 and intake manifold 32.

In order to reduce the available volume in the intake port and to prevent passage of the exhaust gases into said port, a valve member 40 is disposed in said port and disposed as close as possible to the inner surface 18 of the peripheral wall 12. The rotary valve member 40 is substantially cylindrically-shaped and is provided with an opening or port 42 therein for permitting gas flow through said port 42 when said port is aligned in a manner so as to be substantially in line with the intake port 30. The valve member 40 is journalled in each of the end walls 12 and 14, respectively, by bearing journals or trunnions 44, as illustrated in FIG. 2. The trunnions 44 are suitably connected to an adjustment linkage shown at 46 which in turn may be suitably connected to a speed control or carburetor linkage in a well-known manner for adjusting the valve member 40 in accordance with the desired operational speed of the engine.

When the engine is operating at the lower part of the partial-load range or in the idling range, the valve member 40 will be adjusted so that the intake port 30 is substantially closed, thereby substantially preventing any inflow of exhaust gases from the working chamber from entering into said intake port. In order to provide fuel and/or air during this type of engine operation, idling inlet ports 48 and 50 are respectively provided in each of the end walls 12 and 14. The idling inlets 48 and 50 are respectively connected to passageways 52 and 54 in each of the end walls and to idling intake manifold structures 56 and 58 which are a part of the intake manifold 32. Ports 60 and 62 are respectively provided in the trunnions 44 and each of the end walls 12 and 14 for permitting the charge to pass from the associated inlet or intake manifold to the respective idling inlet ports 48 and 50. Thus, it will be seen that during idling or in the lower part of the partial load range, a fresh charge will be provided through the idling ports 48 and 50 while the main intake port 30 is substantially closed by the valve member 40.

As previously mentioned, when the engine is operating at relatively higher speeds, there may be a tendency for the fresh charge of gas from the intake port to flow toward the portion of the working chamber 28 labeled C in FIG. 1 or to pass into the exhaust port 34. In order to prevent this from occurring, the opening or port 42 in the valve member is disposed so that said opening 42 is offset or eccentric to the axis of the valve member as illustrated in FIG. 1. Thus, when the valve member 40 is adjusted for opening the intake port for flow of gas therethrough, the gas will be directed substantially tangential to the inner surface 18 of the peripheral wall and in the direction of rotor rotation, illustrated by the arrow D. Through this construction there will be relatively less likelihood of a reversal of flow of the fresh charge or gas in a direction opposite to the rotor rotation, or in other words, toward the exhaust port 34.

From the above description, it will be apparent that a novel construction is provided for preventing flow of exhaust gases into the intake port during overlap of the intake and exhaust ports for certain positions of rotor rotation. Further, the construction of the valve means used in accomplishing the aforementioned advantage in the invention also provides for prevention of flow of the fresh charge introduced to the working chambers in a direction toward the exhaust port particularly during speeds above the idling speed. If it is desired to use a plurality of rotary combustion engines connected together into a multi-unit construction, rotary valves of the type described above may be provided in each of the units and connected together through a suitable coupling construction to permit individual adjustments of the units so that each of the units may be operated in cooperation with the other units to provide smooth operation of the entire multi-unit construction.

While the invention has been described in detail in the above specification, it will be obvious to those skilled in the art that various changes and modifications may be made therein without departing from the spirit and scope thereof. It is intended that all such modifications be covered in the appending claims.

What is claimed is:

1. A rotary combustion engine having an outer body including a pair of axially spaced end walls interconnected with a peripheral wall to form a cavity, said cavity having a multi-lobed profile; a multi-lobed rotor supported for rotation relative to said outer body, said rotor having a plurality of circumferentially-spaced apex portions disposed in sealing engagement with the inner surface of said peripheral wall to form a plurality of working chambers which during relative rotation of said rotor vary in volume; intake means including a main intake port provided in said peripheral wall for supplying a fresh charge of gas to said working chambers; exhaust means including an exhaust port provided in said peripheral wall for expelling the burnt gases from said working chambers, said main intake port and said exhaust port being in relatively close proximity such that during some positions of rotation of said rotor said spaced apex portions of said rotor span said main intake port and said exhaust port whereby said ports are in communication with one another through a working chamber; and valve means for varying the power output of the engine, said valve means including a main rotary valve body disposed in said main intake port adjacent to the inner surface of said peripheral wall for regulating the flow of gases between said main intake port and said working chambers with said main rotary valve body having an opening therethrough, and said opening being disposed in said main rotary valve body such that at part open positions of said valve body the gas being supplied from said main intake port will be directed substantially tangentially relative to the inner surface of said peripheral wall in the direction of rotor rotation and away from the exhaust port.

2. A rotary combustion engine as recited in claim 1 wherein said main rotary valve body has a substantially cylindrical shape with the axis of said main rotary valve body being disposed parallel to the axis of said outer body cavity and said opening being offset relative to the axis of said main rotary valve body.

3. A rotary combustion engine as recited in claim 1 wherein said intake means further comprises a secondary intake port and said valve means includes a secondary rotary valve body disposed in operative relationship with said secondary intake port for regulating the flow of gas to said working chambers from said secondary intake port.

4. A rotary combustion engine as recited in claim 3 wherein said secondary intake port is located in an end wall of said outer body and disposed such that said rotor periodically uncovers said secondary intake port during rotation thereof for permitting flow of gas into said working chamber, and said secondary rotary valve body being operative during the low speed range of said engine to permit a flow of gas from said secondary intake port into said working chambers.

5. A rotary combustion engine as recited in claim 3 wherein said main rotary valve means is supported by bearing journals in said end walls and said secondary rotary valve body comprises one of said bearing journals for said main rotary valve body.

6. A rotary combustion engine as recited in claim 5 wherein a secondary intake port is provided in each end wall of said outer body and a secondary rotary valve body is provided in each of said secondary intake ports for regulating the flow of gas from said secondary intake ports to said working chambers, and each of said secondary rotary valve bodies comprising a bearing journal for said main rotary valve body.

References Cited
UNITED STATES PATENTS

| | | | |
|---|---|---|---|
| 725,615 | 4/1903 | Cooley. | |
| 3,240,189 | 3/1966 | Stumpfig | 123—8 |
| 3,244,153 | 4/1966 | Froede | 123—8 |

FOREIGN PATENTS

| | | |
|---|---|---|
| 905,226 | 4/1945 | France. |

MARK M. NEWMAN, *Primary Examiner.*

RALPH D. BLAKESLEE, *Examiner.*